US012508123B2

(12) United States Patent
Badur

(10) Patent No.: US 12,508,123 B2
(45) Date of Patent: Dec. 30, 2025

(54) INTRAOCULAR LENS AND TREATMENT APPARATUS

(71) Applicant: Carl Zeiss Meditec AG, Jena (DE)

(72) Inventor: Thorben Badur, Oberkochen (DE)

(73) Assignee: Carl Zeiss Meditec AG, Jena (DE)

( * ) Notice: Subject to any disclaimer, the term of this patent is extended or adjusted under 35 U.S.C. 154(b) by 366 days.

(21) Appl. No.: 17/966,825

(22) Filed: Oct. 15, 2022

(65) Prior Publication Data

US 2023/0040379 A1 Feb. 9, 2023

Related U.S. Application Data

(63) Continuation of application No. PCT/US2020/028368, filed on Apr. 15, 2020.

(51) Int. Cl.
*A61F 2/16* (2006.01)
*A61N 2/00* (2006.01)

(52) U.S. Cl.
CPC .................. *A61F 2/16* (2013.01); *A61N 2/00* (2013.01); *A61F 2002/16901* (2015.04)

(58) Field of Classification Search
CPC .... A61F 2/16; A61F 2002/16901; A61N 2/00
See application file for complete search history.

(56) References Cited

U.S. PATENT DOCUMENTS

| 10,905,546 | B1* | 2/2021 | Kuiper | A61F 2/1662 |
| 2007/0135915 | A1* | 6/2007 | Klima | A61F 2/1629 623/6.37 |
| 2008/0046076 | A1 | 2/2008 | Rombach | |
| 2009/0204210 | A1 | 8/2009 | Pynson | |
| 2011/0054601 | A1* | 3/2011 | Kadziauskas | A61F 2/1624 623/6.39 |
| 2014/0193649 | A1* | 7/2014 | Perrier-Cornet | B41J 3/407 347/225 |
| 2015/0366660 | A1* | 12/2015 | Fernández Martínez | A61F 2/16015 623/6.22 |
| 2021/0275294 | A1* | 9/2021 | Zhang | A61B 1/00174 |
| 2022/0025129 | A1* | 1/2022 | Domb | A61L 17/005 |
| 2024/0073304 | A1* | 2/2024 | Park | H04M 1/0237 |

FOREIGN PATENT DOCUMENTS

| EP | 162573 A2 | 11/1985 |
| EP | 3081193 A1 | 10/2016 |
| WO | 2006055707 A2 | 5/2006 |

OTHER PUBLICATIONS

International Search Report of the European Patent Office in PCT/EP2020/028368 (to which this application claims priority) mailed Oct. 13, 2022.
International Search Report dated Nov. 20, 2020 of international application PCT/US2020/028368 on which this application is based.

* cited by examiner

*Primary Examiner* — Jerrah Edwards
*Assistant Examiner* — Aren Patel
(74) *Attorney, Agent, or Firm* — Ewers IP Law PLLC; Falk Ewers

(57) ABSTRACT

The disclosure relates to an intraocular lens having an optic body and a haptic element including a thermoresponsive polymer having a transition temperature and particles that are magnetic and/or magnetizable. The disclosure additionally relates to a treatment apparatus including the intraocular lens and a magnet set up to subject the intraocular lens to a magnetic field that alternates with time.

19 Claims, 4 Drawing Sheets

INTRAOCULAR LENS AND TREATMENT APPARATUS

CROSS REFERENCE TO RELATED APPLICATIONS

This application is a continuation application of international patent application PCT/US2020/028368, filed Apr. 15, 2020, designating the United States, and the entire content of this application is incorporated herein by reference.

TECHNICAL FIELD

The disclosure relates to an intraocular lens and to a treatment apparatus including the intraocular lens.

BACKGROUND

In cataract treatment of an eye, an incision is conventionally made in the cornea of the eye, said incision being large enough to allow a cannula to be inserted through the incision into the eye. After the incision has been made in the cornea, the lens of the eye is broken up by phacoemulsification and then sucked out of the capsular bag of the eye. Thereafter, an intraocular lens is inserted into the capsular bag via the incision with an injector. The intraocular lens includes an optic body and a haptic element, wherein the haptic element fixes the optic body in the capsular bag.

The haptic element has the function of keeping the optic body as close as possible to the middle of the eye in order to generate an image of maximum quality on the retina of the eye. Moreover, the optic body should be fixed with maximum positional stability in the capsular bag. In addition, the haptic element has the function of stopping the optic body from rotating about its optical axis. This is particularly relevant when the optic body is a toric optic body with which cornea curvature is to be corrected, because the toric optic body, if it is arranged in the capsular bag with an incorrect orientation, leads to an imaging aberration on the retina.

On insertion into the capsular bag, the intraocular lens is first folded in the injector, and then the intraocular lens unfolds again in the capsular bag. When it unfolds, the haptic element moves away from the optic body and as it does so come into contact with the capsular bag and hence fixes the intraocular lens in the capsular bag. When the intraocular lens is fixed in the capsular bag, it is difficult to correct the position and/or orientation of the intraocular lens in the capsular bag. What would be desirable would be an intraocular lens that an operator conducting the cataract treatment can fix in the capsular bag at any given and chosen juncture.

SUMMARY

It is therefore an object of the disclosure to provide an intraocular lens and a treatment apparatus with which the intraocular lens can be fixed in the capsular bag at any given juncture.

The intraocular lens of the disclosure has an optic body and a haptic element including a thermoresponsive polymer having a transition temperature and particles that are magnetic and/or magnetizable. An operator conducting a cataract treatment, after inserting the intraocular lens into the capsular bag, can correct the position and/or orientation of the intraocular lens. Subsequently, the operator can subject the intraocular lens to a magnetic field that alternates with time. This heats the particles and, as a result of conduction of heat in the haptic element, the thermoresponsive polymer can be heated up to above the transition temperature. It is a feature of the thermoresponsive polymer that its physical properties change drastically and discontinuously with temperature. As a result of the changing of the physical properties of the thermoresponsive polymer using the magnetic field that alternates with time, it is possible to fix the intraocular lens in the capsular bag at any given juncture. The physical properties may, for example, be a shape of the thermoresponsive polymer. It is also conceivable that the surface area of the haptic element above the transition temperature is larger than below the transition temperature, that the haptic element has a different surface tension above the transition temperature than below the transition temperature, and/or that a bonding force of the haptic element is activated above the transition temperature.

The particles are typically embedded in the thermoresponsive polymer. As a result, the particles come into contact with the thermoresponsive polymer and hence can heat the thermoresponsive polymer particularly rapidly.

The transition temperature is typically higher than 35° C. This can avoid heating of the thermoresponsive polymer by body heat to a temperature above the transition temperature when the intraocular lens is being inserted into the capsular bag. More typically, the transition temperature is higher than 42° C.

It is typical that the thermoresponsive polymer is set up to change its properties on exceedance of the transition temperature in such a way that, when the intraocular lens is disposed in a capsular bag of an eye, the haptic element is more firmly secured to the capsular bag. The exceedance of the transition temperature is understood to mean heating of the thermoresponsive polymer from temperatures below the transition temperature to temperatures above the transition temperature.

The particles are typically superparamagnetic. In this way, it is possible to achieve magnetism of the particles only when they are subjected to the magnetic field.

It is typical that the particles include iron oxide or consist of iron oxide. This is a particularly well-tolerated substance. More typically, the iron oxide includes $Fe_3O_4$ or consists of $Fe_3O_4$.

It is typical that the thermoresponsive polymer has a glass transition temperature or a melting temperature as the transition temperature and the haptic element is set up to change a shape of the haptic element on exceedance of the transition temperature. The glass transition temperature is the temperature at which the thermoresponsive polymer undergoes a phase transition from a solid state to a viscous state. The shape of the haptic element above the glass transition temperature can be chosen here such that the intraocular lens is fixable in the capsular bag thereby. One example of a thermoresponsive polymer with a glass transition temperature is a copolymer of tert-butyl acrylate and poly(ethylene glycol) dimethylacrylate, as described, for example, in [1]. With the mass ratio of the two substances in the copolymer and the molecular mass of the copolymer, it is possible to adjust the glass transition temperature. The glass transition temperature can be measured, for example, by measuring its modulus of elasticity and/or its modulus of shear when heating the thermoresponsive polymer. The glass transition temperature can be determined at the temperature at which the viscous state of the thermoresponsive polymer begins to form. One example of a thermoresponsive polymer with a melting temperature is a block copolymer including diphenylmethane 4,4'-diisocyanate and butane-1,4-diol, as described in [2].

The haptic element is typically set up to irreversibly change shape on exceedance of the transition temperature. This can prevent the haptic element from reassuming its original shape prior to the exceedance of the transition temperature when the thermoresponsive polymer cools back down to temperatures below the transition temperature.

The haptic element typically includes a composite material including an elastomer and the thermoresponsive polymer, wherein the elastomer is under mechanical stress prior to the exceedance of the transition temperature. On exceedance of the transition temperature, there is deformation of the elastomer and the thermoresponsive polymer likewise disposed in the haptic element. The elastomer here loses at least some of its mechanical stress.

It is typical that the shape of the haptic element is a wavy shape at least in part of the region of the haptic element above the transition temperature. More typically, the haptic element is free of the wavy shape in that part of the region below the transition temperature. By changing the shape of the haptic element from the shape free of the wavy shape to the wavy shape, the intraocular lens is more strongly fixable in the capsular bag.

Alternatively or additionally, it is typical that the haptic element has an edge above the transition temperature at least in part of the region of the haptic element and is edge-free below the transition temperature in that part of the region. By virtue of a change from the edge-free shape of the haptic element to the shape of the haptic element with the edge, the intraocular lens is more strongly fixable in the capsular bag.

Alternatively or additionally, it is typical that the haptic element has a larger surface area above the transition temperature than below the transition temperature. By virtue of the larger surface area, the intraocular lens is more strongly fixable in the capsular bag. More typically, the haptic element has projections at its surface that have a larger surface area above the transition temperature than below the transition temperature. The projections may have a wedge shape, for example.

It is typical that the thermoresponsive polymer forms the surface of the haptic element at least in part of the region of the haptic element and the transition temperature is an upper critical solution temperature of the thermoresponsive polymer in a solvent or a lower critical solution temperature of the thermoresponsive polymer in the solvent. An example of such a thermoresponsive polymer are a homopolymer including or consisting of poly(N,N-diethylacrylamide), and a homopolymer including or consisting of poly(N-acryloyl-4-trans-hydroxy-L-proline), as described in [3]. If the thermoresponsive polymer is in the region of a miscibility gap, the thermoresponsive polymer is at the surface. If the thermoresponsive polymer is outside the miscibility gap, the thermoresponsive polymer projects into the solvent. This transformation is also referred to as the coil-globule transition, where the coil refers to the thermoresponsive polymer outside the miscibility gap and the globule to the thermoresponsive polymer within the miscibility gap. It is thus possible to change the physical properties of the surface of the haptic element, for example the bonding force of the haptic element and/or the surface tension of the haptic element. The upper critical solution temperature and the lower critical solution temperature may be determined, for example, as the temperature at which cloudiness first occurs in a mixture of the thermoresponsive polymer and the solvent. The solvent typically includes water or consists of water.

It is typical that an active ingredient is embedded in the thermoresponsive polymer and the thermoresponsive polymer is set up to release the active ingredient on exceedance of the transition temperature. The active ingredient may include, for example, an inflammation inhibitor, for example dexamethasone, and/or phenylethyl caffeate.

It is typical that the thermoresponsive polymer forms the surface of the haptic element at least in part of the region of the haptic element and is set up such that a chemical bond of the thermoresponsive polymer breaks on exceedance of the transition temperature. For example, one option for the thermoresponsive polymer is a 2,2'-azobis(2-amidinopropane) dihydrochloride. It is thus possible to change the physical properties of the surface of the haptic element, for example the bonding force of the haptic element and/or the surface tension of the haptic element. The transition temperature at which the chemical bond breaks can be measured by spectroscopy for example, especially with IR absorption spectroscopy. The transition temperature can be determined as the temperature at which the formation of the fragments that arise from the breakage of the bond are first detected.

On exceedance of the transition temperature, the chemical bond typically breaks irreversibly. This can prevent the haptic element from reassuming its original properties at the surface prior to the exceedance of the transition temperature when the thermoresponsive polymer cools back down to temperatures below the transition temperature.

It is typical that the thermoresponsive polymer has two longitudinal ends each bonded to a part of the haptic element other than the thermoresponsive polymer.

It is typical that the intraocular lens includes a first thermoresponsive polymer that forms the surface of the haptic element in that part of the region of the haptic element, and a second thermoresponsive polymer that has the glass transition temperature or melting temperature and is set up to irreversibly change the shape of the haptic element on exceedance of the transition temperature.

The treatment apparatus of the disclosure includes the intraocular lens and a magnet set up to subject the intraocular lens to a magnetic field that alternates with time. The magnetic field that alternates with time makes it possible to reach the particles at every point in the capsular bag. The magnet may, for example, be an electromagnet.

BRIEF DESCRIPTION OF THE DRAWINGS

The disclosure will now be described with reference to the drawings wherein.

DESCRIPTION OF EXEMPLARY EMBODIMENTS

Figure 1:
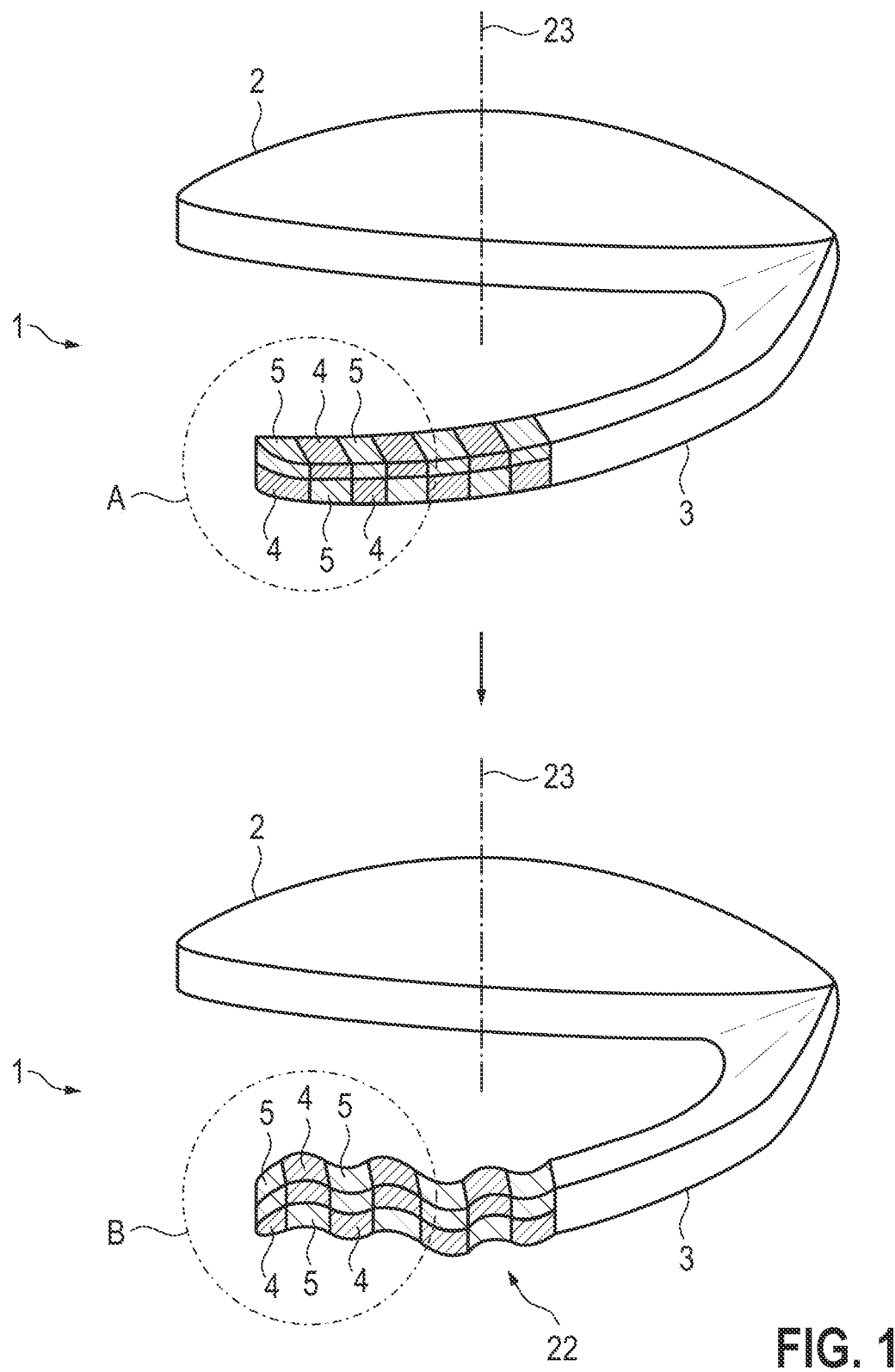
FIG. 1 shows a view of a first exemplary embodiment of the intraocular lens of the disclosure.
Figure 2:
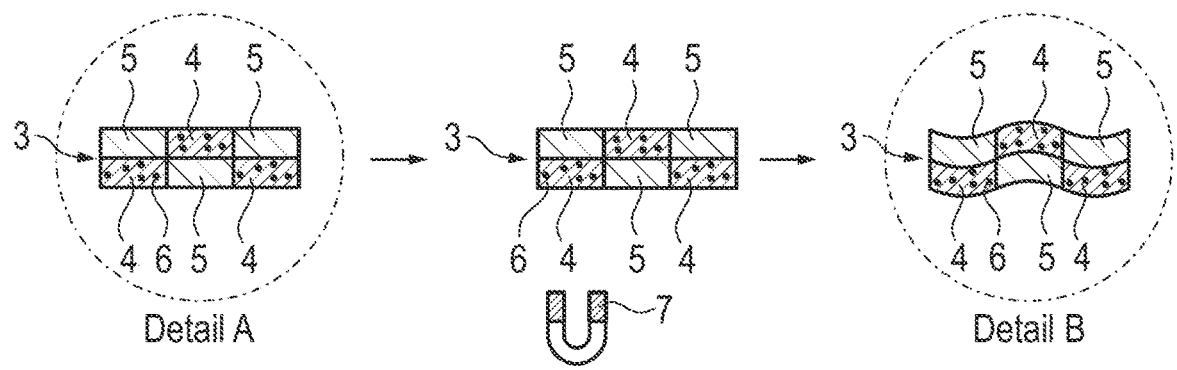
FIG. 2 shows a detail from FIG. 1.
Figure 3:
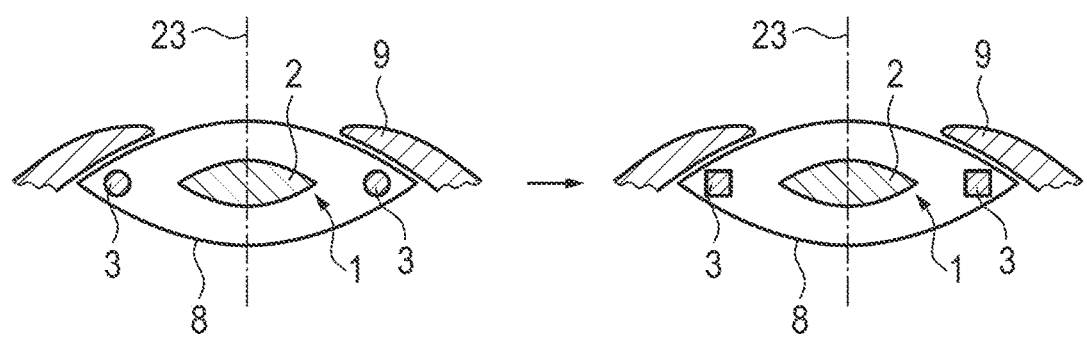
FIG. 3 shows a horizontal section through an eye with a second exemplary embodiment of the intraocular lens of the disclosure.
Figure 4:
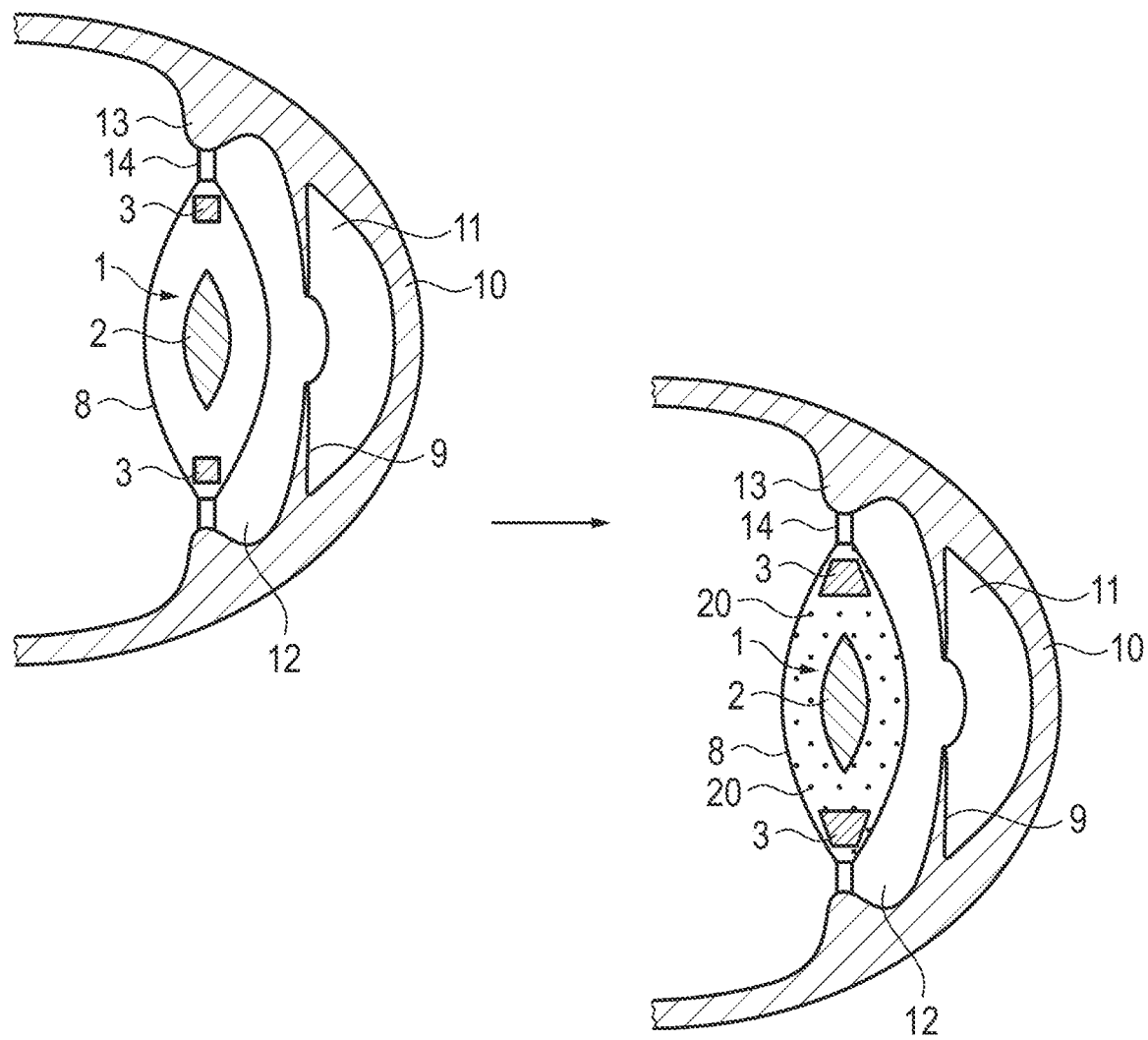
FIG. 4 shows a vertical section through an eye with a third exemplary embodiment of the intraocular lens of the disclosure.

FIGS. 1, 3 and 4 show that an intraocular lens 1 has an optic body 2 and a haptic element 3. As apparent from FIGS. 1, 2, 5 and 6, the haptic element 3 includes a thermoresponsive polymer 4 having a transition temperature and particles 6 that are magnetic and/or magnetizable.

FIGS. 1 to 4 show that the thermoresponsive polymer 4 can be set up to change its properties on exceedance of the transition temperature in such a way that, when the intraocular lens 1 is disposed in a capsular bag 8 of an eye, the haptic element 3 is more firmly secured to the capsular bag 8. The exceedance of the transition temperature is understood to mean heating of the thermoresponsive polymer 4 from temperatures below the transition temperature to temperatures above the transition temperature. The transition temperature may be higher than 35° C. or higher than 42° C.

The particles 6 may be superparamagnetic for example. The particles 6 may include iron oxide or consist of iron oxide. The iron oxide may be $Fe_3O_4$ for example. The particles 6 may be nanoparticles. For example, an average value in a plot of the number of particles 6 against the size of the particles 6 may be shorter than 1 μm or shorter than 100 nm, where the size is the longest length that occurs in the particles 6.

In the first exemplary embodiment of the intraocular lens 1 according to FIGS. 1 and 2, the thermoresponsive polymer 4 has a glass transition temperature or a melting temperature as the transition temperature and the haptic element 3 is set up to change a shape of the haptic element 3 on exceedance of the transition temperature. FIG. 1 shows the intraocular lens 1 in two different states, with the top intraocular lens 1 in FIG. 1 at a temperature below the transition temperature and the bottom intraocular lens in FIG. 1 at a temperature above the transition temperature. FIG. 1 shows that the shape of the haptic element 3 is a wavy shape 22 at least in part of the region of the haptic element 3 above the transition temperature and the shape of the haptic element 3 is free of the wavy shape 22 in that part of the region below the transition temperature. The part of the region here may be disposed at the longitudinal end of the haptic element 3 remote from the optic body 2. The particles 6 may be embedded in the thermoresponsive polymer 4.

FIGS. 1 and 2 show that the haptic element 3 may include an elastomer 5 under mechanical stress prior to the exceedance of the transition temperature. On exceedance of the transition temperature, the elastomer 5 loses mechanical stress and deforms the thermoresponsive polymer 4 that has been converted from its solid state to a viscous state and hence become deformable. This achieves a setup of the haptic element 3 so as to change shape irreversibly on exceedance of the transition temperature.

It is shown in FIGS. 1 and 2 that the haptic element 3 in the part of the region may be formed by two layers arranged alongside one another in a direction parallel to the optical axis 23 of the optic body 2 in an unstressed state. Each of the layers has the thermoresponsive polymer 4 and the elastomer 5 in alternation in a direction from the longitudinal end of the haptic element 3 that secures it to the optic body 2 toward the longitudinal end of the haptic element 3 remote from the optic body 2. The thermoresponsive polymer 4 and the elastomer 5 are in a mutually offset arrangement in the two layers. FIG. 2 shows the part of the region in an enlargement and at three different junctures, with time continually advancing from left to right. It is shown on the left that the temperature of the haptic element 3 is below the transition temperature, and in the middle that the haptic element 3 is heated with a magnet 7 set up to generate a magnetic field that alternates with time. It is shown on the right that the haptic element 3 has been heated to a temperature above the transition temperature and hence has the wavy shape 22 in the part of the region.

In the second exemplary embodiment of the intraocular lens 1 according to FIG. 3, the thermoresponsive polymer 4 has a glass transition temperature or a melting temperature as the transition temperature and the haptic element 3 is set up to change a shape of the haptic element 3 on exceedance of the transition temperature. FIG. 3 shows a horizontal section through an eye with an iris 9 and a capsular bag 8, in which the intraocular lens 1 is shown in two different states. On the left in FIG. 3 the intraocular lens 1 is at a temperature below the transition temperature, and on the right in FIG. 3 the intraocular lens is at a temperature above the transition temperature. The haptic element 3 has an edge at least in part of the region of the haptic element 3 above the transition temperature and is edge-free in that part of the region below the transition temperature. For example, the haptic element 3, in a cross section in which the optical axis 23 of the optic body 2 is disposed, may be round below the transition temperature and in rectangular form above the transition temperature.

In the third exemplary embodiment of the intraocular lens 1 according to FIG. 4, the thermoresponsive polymer 4 has a glass transition temperature or a melting temperature as the transition temperature and the haptic element 3 is set up to change a shape of the haptic element 3 on exceedance of the transition temperature. FIG. 3 shows a vertical section through an eye in which a cornea 10, an anterior eye chamber 11, an iris 9, a posterior eye chamber 12 and the capsular bag 8 are shown. Likewise shown are a ciliary muscle 13 and zonular fibers 14. The intraocular lens 1 is disposed in the capsular bag 8 and is shown in two different states. On the left in FIG. 4 the intraocular lens 1 is at a temperature below the transition temperature, and on the right in FIG. 4 the intraocular lens is at a temperature above the transition temperature. It is apparent that the haptic element 3 has a larger surface area above the transition temperature than below the transition temperature.

Figure 5:
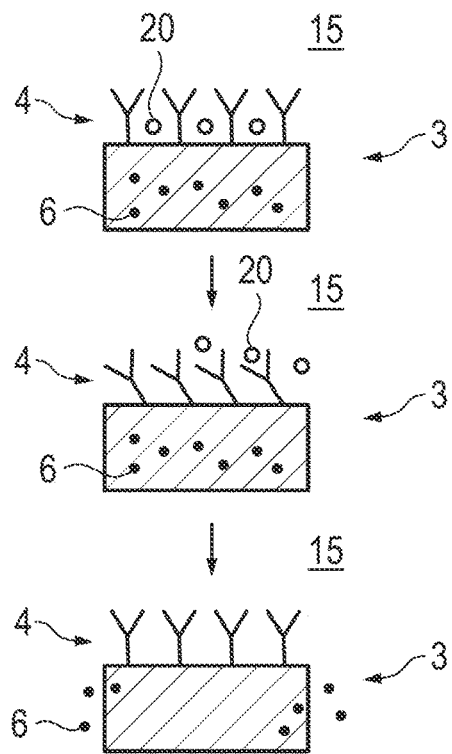
FIG. 5 shows a section of a haptic element of a fourth exemplary embodiment of the intraocular lens.

In the fourth exemplary embodiment of the intraocular lens 1 according to FIG. 5, the thermoresponsive polymer 4 forms the surface of the haptic element 3 at least in part of the region of the haptic element 3, and the transition temperature is a lower critical solution temperature of the thermoresponsive polymer 4 in a solvent 15. The solvent 15 here may include water or consist of water. The particles 6 may be disposed outside the thermoresponsive polymer 4 in the haptic element 3. As apparent from FIG. 5, an active ingredient 20 may have been embedded in the thermoresponsive polymer and the thermoresponsive polymer 4 may have been set up to release the active ingredient 20 on exceedance of the transition temperature. FIG. 5 shows the haptic element 3 at three different junctures, with continually advancing time from the top downward. At the first juncture, the temperature of the haptic element 3 is below the lower critical solution temperature and the thermoresponsive polymer 4 projects into the solvent 15. The active ingredient 20 is disposed here between individual chains of the thermoresponsive polymer 4. At the second juncture, the temperature of the haptic element 3 is above the lower critical solution temperature and the thermoresponsive polymer 4 precipitates out of the solvent 15, as a result of which the thermoresponsive polymer 4 adjoins the surface of the haptic element 3 and the active ingredient 20 is released. At the third juncture, the temperature of the haptic element 3 is below the lower critical solution temperature again, as a result of which the thermoresponsive polymer 4 projects into the solvent 15 again. It is additionally apparent that the particles 6 may be set up to diffuse out of the haptic element 3 with time. The particles 6 may additionally be set up to break down subsequently.

Figure 6:
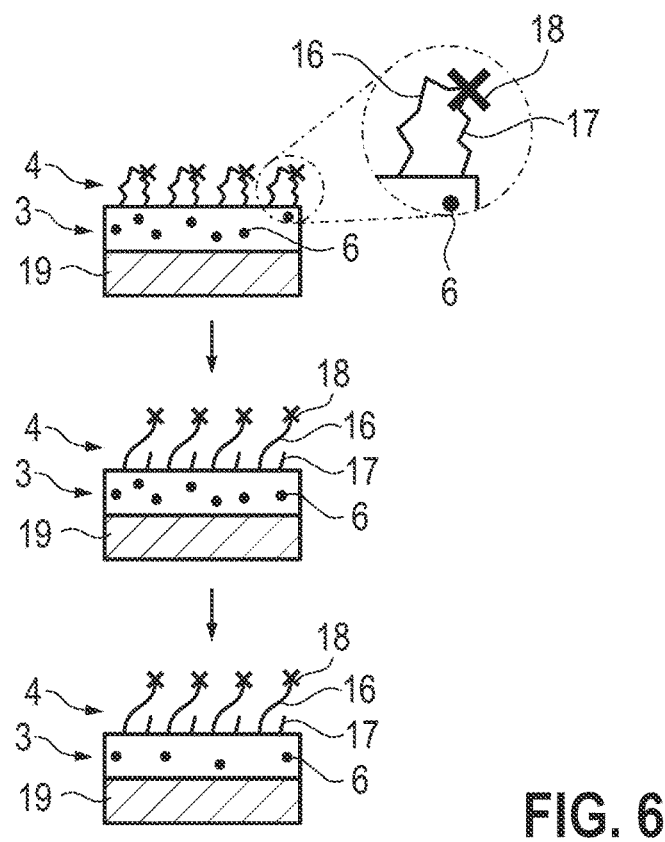
FIG. 6 shows a section of a haptic element of a fifth exemplary embodiment of the intraocular lens.

In the fifth exemplary embodiment of the intraocular lens 1 according to FIG. 6, the thermoresponsive polymer 4 forms the surface of the haptic element 3 at least in part of the region of the haptic element 3 and is set up such that a chemical bond of the thermoresponsive polymer 4 breaks on exceedance of the transition temperature. The thermoresponsive polymer 4 may have two longitudinal ends each bonded to a part of the haptic element 3 other than the thermoresponsive polymer 4. In addition, the thermoresponsive polymer 4 may have a thermally labile group 18 having the chemical bond that breaks on exceedance of the transition temperature. As a result, the thermoresponsive polymer fragments into a first polymer fragment 16 and a second polymer fragment 17. It is additionally apparent that the particles 6 may be set up to diffuse out of the haptic element 3 with time. The particles 6 may additionally be set up to break down subsequently.

A treatment apparatus includes the intraocular lens 1 and a magnet 7 set up to subject the intraocular lens 1 to a magnetic field that alternates with time. The magnet 7 may be an electromagnet.

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS

1 intraocular lens
2 optic body
3 haptic element
4 thermoresponsive polymer
5 elastomer
6 particles
7 magnet
8 capsular bag
9 iris
10 cornea
11 anterior eye chamber
12 posterior eye chamber
13 ciliary muscle
14 zonular fibers
15 solvent
16 first polymer fragment
17 second polymer fragment
18 thermally labile group
19 substrate
20 active ingredient
22 wavy shape
23 optical axis

What is claimed is:

1. An intraocular lens, comprising:
   an optic body; and
   a haptic element including a thermoresponsive polymer having a transition temperature and particles that are magnetic and/or magnetizable,
   wherein the thermoresponsive polymer forms the surface of the haptic element at least in part of a region of the haptic element and is set up such that a chemical bond of the thermoresponsive polymer breaks on exceedance of the transition temperature.

2. The intraocular lens as claimed in claim 1, wherein the particles have been embedded in the thermoresponsive polymer.

3. The intraocular lens as claimed in claim 1, wherein the transition temperature is higher than 35° C. or higher than 42° C.

4. The intraocular lens as claimed in claim 1, wherein the thermoresponsive polymer is set up to change its properties on exceedance of the transition temperature such that, when the intraocular lens is disposed in a capsular bag of an eye, the haptic element is more firmly secured to the capsular bag.

5. The intraocular lens as claimed in claim 1, wherein the particles are superparamagnetic.

6. The intraocular lens as claimed in claim 1, wherein the particles include iron oxide or consist of iron oxide.

7. The intraocular lens as claimed in claim 1, wherein the thermoresponsive polymer has a glass transition temperature or a melting temperature as the transition temperature and the haptic element is set up to change a shape of the haptic element on exceedance of the transition temperature.

8. The intraocular lens as claimed in claim 7, wherein the haptic element is set up to change shape irreversibly on exceedance of the transition temperature.

9. The intraocular lens as claimed in claim 7, wherein the haptic element includes a composite material including an elastomer and the thermoresponsive polymer, and
   wherein the elastomer is under mechanical stress prior to the exceedance of the transition temperature.

10. The intraocular lens as claimed in claim 7, wherein the shape of the haptic element is a wavy shape at least in part of the region of the haptic element above the transition temperature.

11. The intraocular lens as claimed in claim 7, wherein the haptic element has an edge above the transition temperature at least in part of the region of the haptic element and is edge-free below the transition temperature in that part of the region.

12. The intraocular lens as claimed in claim 7, wherein the haptic element has a larger surface area above the transition temperature than below the transition temperature.

13. The intraocular lens as claimed in claim 1, wherein the thermoresponsive polymer forms the surface of the haptic element at least in part of the region of the haptic element and the transition temperature is an upper critical solution temperature of the thermoresponsive polymer in a solvent or a lower critical solution temperature of the thermoresponsive polymer in the solvent.

14. The intraocular lens as claimed in claim 13, wherein the solvent includes water or consists of water.

15. The intraocular lens as claimed in claim 14, wherein an active ingredient is embedded in the thermoresponsive polymer and the thermoresponsive polymer is set up to release the active ingredient on exceedance of the transition temperature.

16. The intraocular lens as claimed in claim 1, wherein the chemical bond breaks irreversibly when the transition temperature is exceeded.

17. The intraocular lens as claimed in claim 1, wherein the thermoresponsive polymer has two longitudinal ends each bonded to a part of the haptic element other than the thermoresponsive polymer.

18. A treatment apparatus, comprising:
    an intraocular lens as claimed in claim 1; and
    a magnet set up to subject the intraocular lens to a magnetic field that alternates with time.

19. An intraocular lens, comprising:
a first thermoresponsive polymer which forms a surface of a haptic element at least in that part of a region of the haptic element; and
a second thermoresponsive polymer which has a glass transition temperature or a melting temperature and is set up to irreversibly change the shape of the haptic element on exceedance of the transition temperature.

\* \* \* \* \*